United States Patent [19]

Maitland

[11] Patent Number: 4,949,354
[45] Date of Patent: Aug. 14, 1990

[54] LASER APPARATUS HAVING A DISCHARGE TRIGGERING DEVICE INSIDE A LASER TUBE

[75] Inventor: Arthur Maitland, St. Andrews, Scotland

[73] Assignee: English Electric Valve Company Limited, Chelmsford, United Kingdom

[21] Appl. No.: 33,145

[22] Filed: Apr. 2, 1987

[30] Foreign Application Priority Data

Apr. 9, 1986 [GB] United Kingdom ................ 8608610

[51] Int. Cl.$^5$ .............................................. H01S 3/03
[52] U.S. Cl. .................................... 372/61; 372/62; 372/56; 372/87; 372/88
[58] Field of Search .................. 372/61, 62, 56, 69, 372/81, 87, 88

[56] References Cited

U.S. PATENT DOCUMENTS

| | | |
|---|---|---|
| 3,321,714 | 5/1967 | Tien . |
| 3,402,367 | 9/1968 | Kobayashi . |
| 3,624,548 | 11/1971 | Sosnowski .......................... 372/56 |
| 3,628,177 | 12/1971 | Hammer et al. . |
| 3,678,409 | 7/1972 | Rose . |
| 3,688,217 | 8/1972 | Witte et al. . |
| 4,412,333 | 10/1983 | McLellan ............................ 372/87 |
| 4,481,630 | 11/1984 | Box et al. .......................... 372/38 |

*Primary Examiner*—William L. Sikes
*Assistant Examiner*—Georgia Y. Epps
*Attorney, Agent, or Firm*—Spencer & Frank

[57] ABSTRACT

Laser apparatus includes a gas filled tube and is arranged to act as a switch to trigger, within the tube itself, a discharge. The power dissipated in the discharge is applied to material which forms, or is to form, a laser amplifying medium, to provide pumping power. Thus, no external switch, such as a thyratron, is required, unlike conventional laser arrangements.

32 Claims, 3 Drawing Sheets

LASER APPARATUS HAVING A DISCHARGE TRIGGERING DEVICE INSIDE A LASER TUBE

FIELD OF THE INVENTION

This invention relates to laser apparatus and more particularly to apparatus in which a discharge is employed as a source of pumping energy.

BACKGROUND TO THE INVENTION

Laser apparatus requires a source of pumping power to produce excitation of a laser amplifying medium. In one class of lasers, pumping power is provided by a discharge produced between two electrodes in a gas-filled tube. The gas may itself act as the laser amplifying medium, or may comprise a buffer gas in which the discharge occurs and which heats other material within the tube to provide vapour which acts as the amplifying medium. For example, in a metal vapour laser, the discharge is produced in a buffer gas and the heat of the discharge causes vapour to be produced from a solid metal charge within the tube.

To produce a discharge within the discharge tube a suitably large potential difference must be applied between its two electrodes. The breakdown voltage at which a discharge occurs is dependent on the gas pressure within the tube and the distance between the electrodes, in accordance with Paschen's law. The potential difference is applied between the electrodes in the discharge tube by using a circuit arrangement which includes a capacitor and a thyratron. Initially, the thyratron is not conducting and the capacitor is charged. The circuit is designed so that, when it is desired to produce a discharge within the discharge tube, the thyratron is triggered into conduction and the energy stored by the capacitor discharges through the gas in the tube.

SUMMARY OF THE INVENTION

The present invention seeks to provide improved laser apparatus.

According to this invention there is provided a laser apparatus comprising a gas-filled tube arranged to act as a switch to trigger, within the tube itself, a discharge, power dissipated in the discharge being arranged to be applied to material which forms, or is to form, at least part of a laser amplifying medium. Thus, since the tube in which the discharge is triggered itself acts as a switch, no thyratron is required, unlike conventional arrangements. Laser apparatus in accordance with the invention may therefore be made more compact. The power dissipated in the discharge may be arranged to pump the material or, if it is a solid, for example, to vaporize it prior to pumping. In the latter example, the discharge, or a subsequent one, formed in the tube may also provide pumping after vaporization. The gas contained by the tube may itself be, in whole or in part, the material which forms, or is to form, the laser amplifying medium.

It is preferred that there are included within the tube an anode, a cathode and a control electrode, arranged such that, in operation, a potential difference is applied between the anode and cathode and, on application of a trigger potential to the control electrode, the discharge is initiated. The control electrode may initially be held at a potential to prevent a discharge and, when a discharge is required, a different potential may be applied to cause initiation of the discharge. More than one control electrode may be included in the tube if desired.

In another advantageous embodiment of the invention, there are included means for introducing an electron beam into the tube, and an anode and cathode within the tube, arranged such that, in operation, a potential difference is applied between the anode and cathode and, on introduction of the electron beam into the tube, the discharge is established between the anode and cathode. The electron beam need not be arranged to travel the whole distance between the anode and cathode, as ionized particles created by it tend to be drawn towards the anode and cathode because of the field which exists between them, to enable the discharge to be formed between the anode and cathode.

It is preferred that the means for introducing an electron beam into the tube comprises a cathode member having a hole therein, an anode member located within a gas filled volume and means for applying a sufficiently high potential difference between them such that, on application of the potential difference, an electron beam is formed extensive of the hole. The cathode and anode members could be located outside the tube within a separate gas-filled envelope but they may be more conveniently positioned within the gas-filled tube.

Preferably the anode member is electrically connected to the cathode.

Advantageously, a plurality of hollow cylindrical metal segments spaced apart from each other are distributed along the tube. Since electric field penetration into the region within a cylindrical segment is much reduced at distances along the axis of the segment greater than the segment diameter, a sequence of such segments can be effective in reducing the electric field in the axial regions between the anode and cathode. Thus, a larger potential difference can be maintained without breakdown between the anode and cathode when metal segments are included than is the case when they are not present.

Preferably, where a control electrode is included within the tube, one of the segments is arranged to act as the control electrode. The segments may be of any convenient configuration, but preferably, at least one of them comprises a plurality of cylinders arranged coaxially about one another. Such a configuration is advantageous in controlling thermal conductivity from the discharge region to the outer surroundings of the tube. The segments may be distributed along substantially the whole length of the tube, and conveniently each pair of adjacent segments is spaced apart by the same distance as each other pair. Preferably, the anode and cathode of the tube are respective segments of the plurality, and in one arrangement they are the two end segments. The segment arranged to act as a control electrode may be that located nearest the cathode or that nearest the anode.

In one particularly convenient configuration, the anode and cathode are connected directly to respective plates of a capacitor and means are included for charging the capacitor. By being directly connected it is meant that there is no intervening switch or break in the circuit but that the connection might be made for example via a resistive and/or inductive element.

BRIEF DESCRIPTION OF THE DRAWINGS

The invention is now further described by way of example with reference to the accompanying drawings in which.

DESCRIPTION OF PREFERRED EMBODIMENTS

Figure 1:
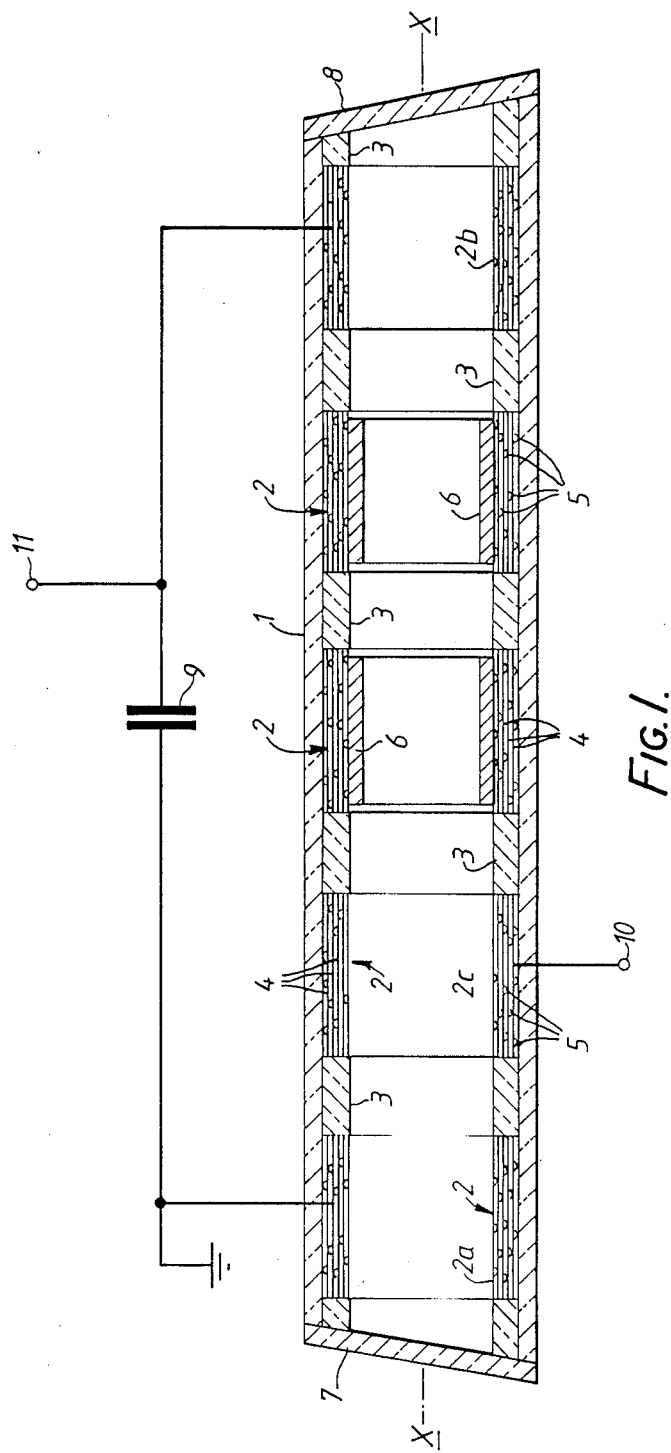
FIG. 1 is a schematic longitudinal section of apparatus in accordance with the invention.

With reference to FIG. 1, laser apparatus includes a tube 1 of ceramic or quartz which contains a buffer gas of neon at a pressure of a few torr, and a plurality of spaced metal segments 2 which are distributed along the longitudinal axis X—X of the tube 1, and which are electrically isolated from one another by ceramic spacers 3. Each of the segments 2 comprises a structure of five molybdenum cylinders 4 arranged coaxially about one another and spaced from one another by metal spacers 5. Copper-loaded tungsten cylinders 6 are positioned inside some of the segments 2. Windows 7 and 8 are provided at each end of the tube 1.

The end segments 2a and 2b of the tube are electrically connected to respective plates of a capacitor 9. One of the end segments 2a is earthed and is arranged to act as a cathode. The segment 2b acts as an anode. The segment 2c adjacent to the earthed end segment 2a is electrically connected to a terminal 10. The other segments within the tube are arranged to float in potential.

During operation of the laser apparatus, the capacitor 9 is charged by applying a voltage at terminal 11 and a high potential difference is built up between the end segments 2a and 2b. During this period, the segment 2c which is connected to act as a control electrode is kept at a fixed bias potential. Once charging is completed, a discharge may be initiated within the tube at a desired time by changing the potential of the control electrode 2c at 10. A discharge is then initiated and develops along the tube between the two end electrodes 2a and 2b.

The discharge present in the tube 1 causes the copper 6 to become vaporized and, when a sufficient vapour pressure is reached, the vapour becomes excited and acts as a laser amplifying medium. The resulting laser radiation leaves the tube 1 via end windows 7 and 8.

Once the capacitor 9 has fully discharged through the gas contained within the tube 1, the discharge ceases. The laser apparatus is operated in a repetitively pulsed mode by re-applying the fixed bias potential to the control electrode 2c and recharging the capacitor 9. Several pulses may be required before sufficient copper vapour is present to enable laser action to be achieved.

Figure 2:
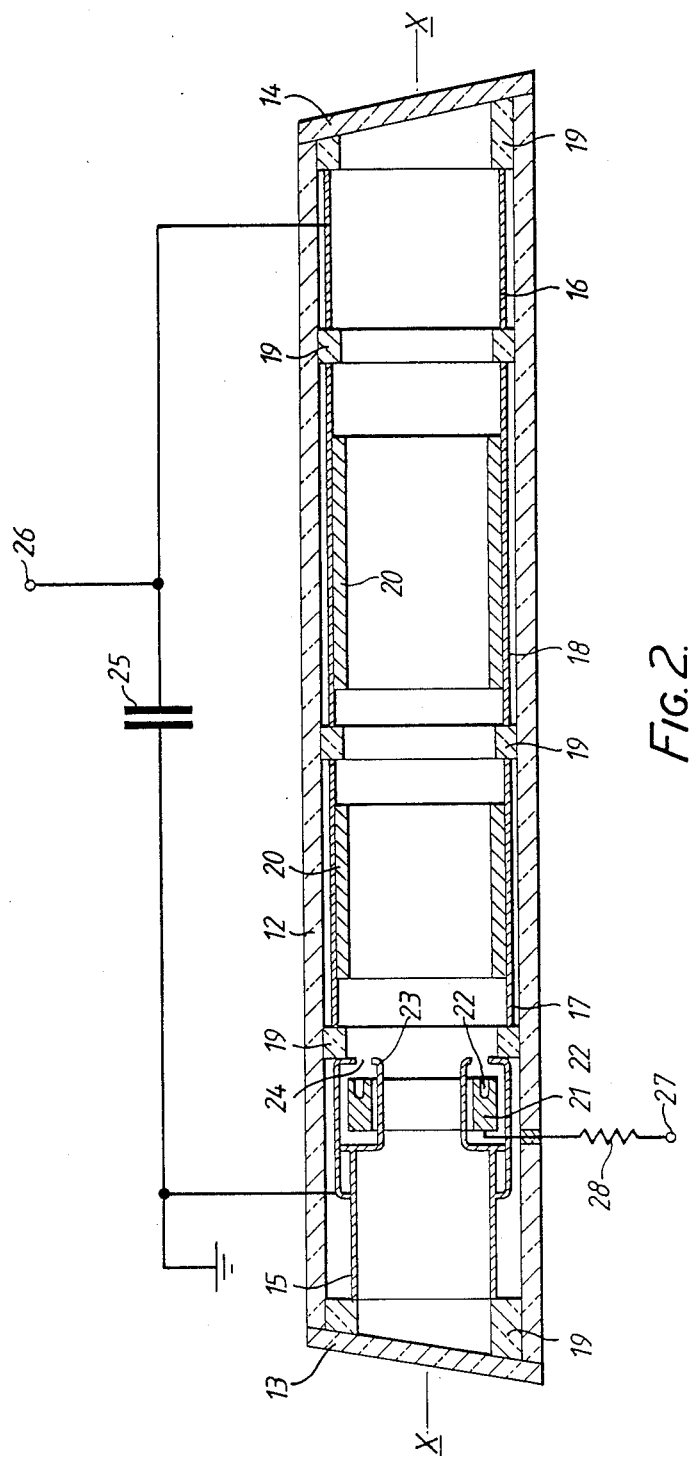
FIG. 2 is a schematic longitudinal section of another apparatus in accordance with the invention.

With reference to FIG. 2, laser apparatus in accordance with the invention includes a quartz tube 12 having end windows 13 and 14. The tube 12 contains neon buffer gas at a pressure of about 2 torr. A cylindrical cathode 15 is located at one end of the tube 12, and an anode 16 at the other end. Two cylindrical metal segments 17 and 18 are located between the cathode and anode 15 and 16, ceramic spacers 19 being arranged to electrically isolate them and hold them in position Copper loaded tungsten cylinders 20 are located within the metal segments 17 and 18.

A cylindrical tungsten cathode member 21 is located at the cathode end of the tube 12, being arranged coaxially about the longitudinal axis X—X. There is an annular slot 22 of about 5 millimeters depth in the face of the cathode member 21 directed towards the anode end of the tube 12. An anode member 23 is arranged about the cathode member 21 such that it almost wholly encloses it, being spaced a few millimeters from the cathode member surface, and an annular slot 24 in the anode member 23 is aligned with the slot 22 in the cathode member 21. The anode member is electrically connected to the cathode 15.

The cathode and anode 15 and 16 are connected to respective plates of a capacitor 25, the cathode 15 being earthed. The cylindrical segments 17 and 18 are arranged to float in potential.

During operation of the laser apparatus the capacitor 25 is charged by applying a voltage at terminal 26 to create a potential difference of about 20kV between the cathode and anode 15 and 16. This potential difference is not sufficient to cause breakdown of the gas between the electrodes. When it is wished to initiate a discharge within the tube 12, a negative potential pulse of about −5kV is applied to the cathode member 21 via terminal 27. Since the cathode member 21 and anode member 23 are spaced only a small distance apart from each other no discharge occurs between them, in accordance with Paschen's law. The pulse is applied via a resistance 28 of about 100, kilo ohms, the cathode and anode member structure operating in a high impedance mode. On application of the pulse, an electron beam is formed extensive of the slot 22 in a direction towards the anode 16. The high energy electrons of the beam cause ionization of the neon within the tube 12 and a discharge is established between the cathode 15 and anode 16. The discharge causes copper to become vaporized and, when a sufficient vapour pressure is reached, the vapour acts as a laser amplifying medium.

Other configurations of the cathode member 21 are possible, and other slot configurations could be used. For example, a plurality of slots could be used to produce a plurality of electron beams. Also, a continuous metal tube may be used in place of the segments 17 and 18, reducing contamination of the tube walls and ceramic surfaces even more than is possible with a plurality of segments.

Figure 3:
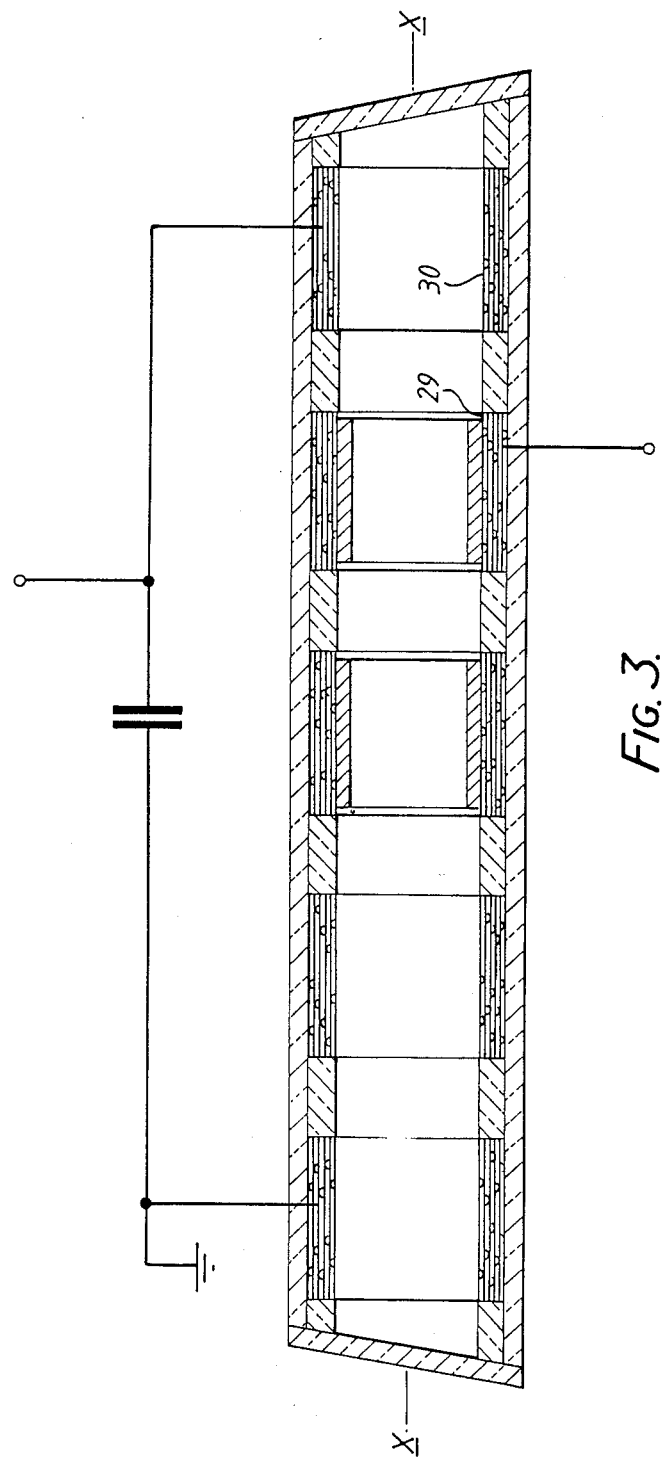
FIG. 3 is a schematic longitudinal section of a further apparatus in accordance with the invention.

With referent to FIG. 3, in another laser apparatus similar to that illustrated in FIG. 1, the control electrode is arranged to be that segment 29 adjacent the segment 30 arranged to act as the anode.

I claim:

1. Laser apparatus, comprising: a gas filled tube having a longitudinal axis; an anode in said tube; a cathode in said tube; material in said tube to form at least part of a laser amplifying medium; storage means located outside said tube for storing charge, said storage means applying a potential difference between said anode and cathode; and trigger means within said tube for acting as a switch to cause said storage means to discharge through said tube, power dissipated in the discharge being applied to said material, said trigger means including a control electrode inside said tube, said anode, cathode, and control electrode being spaced along said longitudinal axis with said control electrode being disposed between said anode and said cathode, wherein said discharge is formed by applying a trigger potential to said control electrode, and wherein said tube defines a volume within which, during operation, laser action occurs.

2. Laser apparatus as claimed in claim 1 including a plurality of spaced metal segments distributed along said tube.

3. Laser apparatus as claimed in claim 2 wherein said control electrode comprises a further metal segment.

4. Laser apparatus as claimed in claim 3, wherein said control electrode is located between said anode and said spaced metal segments.

5. Laser apparatus as claimed in claim 3, wherein said control electrode is located between said cathode and said spaced metal segments.

6. Laser apparatus as claimed in claim 2, wherein said anode and said cathode respectively comprise additional metal segments.

7. Laser apparatus as claimed in claim 6, wherein said plurality of spaced metal segments are disposed between said anode and cathode.

8. Laser apparatus as claimed in claim 2, wherein at least one of said segments comprises a plurality of cylinders arranged coaxially about one another.

9. Laser apparatus as claimed in claim 2, wherein each pair of adjacent segments is spaced apart by the same distance as each other pair.

10. Laser apparatus as claimed in claim 1, wherein said storage means comprises a capacitor having plates, wherein said anode and cathode are connected directly to respective plates of the capacitor, and including means for charging said capacitor.

11. Laser apparatus, comprising: a gas filled tube; an anode within said tube; a cathode within said tube; material within said tube to form at least part of a laser amplifying medium; storage means located outside said tube for storing charge, said storage means applying a potential difference between said anode and said cathode; and trigger means within said tube for acting as a switch to cause said storage means to discharge through said tube, power dissipated in the discharge being applied to said material, said trigger means including means for introducing an electron beam into said tube, wherein, on introduction of the electron beam into said tube, said discharge is established between said anode and cathode, wherein said tube defines a volume within which, during operation, laser action occurs, and wherein said means for introducing an electron beam includes a cathode member having a hole therein, and an anode member, located within said tube, and means for applying a sufficiently high potential difference between said cathode member and said anode member that, on application of the potential difference, an electron beam is formed extensive of said hole.

12. Laser apparatus as claimed in claim 11, wherein said anode member is electrically connected to said cathode.

13. Laser apparatus as claimed in claim 12 and including a plurality of spaced metal segments distributed along said tube.

14. Laser apparatus as claimed in claim 13 wherein said anode and cathode respectively comprise additional metal segments.

15. Laser apparatus as claimed in claim 14 wherein said plurality of spaced metal segments are disposed between said anode and cathode.

16. Laser apparatus as claimed in claim 13, wherein at least one of said segments comprises a plurality of cylinders arranged coaxially about one another.

17. Laser apparatus as claimed in claim 13, wherein each pair of adjacent segments is spaced apart by the same distance as each other pair.

18. Laser apparatus as claimed in claim 11, wherein said material is metal.

19. Laser apparatus, comprising: a gas filled tube; an anode within said tube; a cathode within said tube; material within said tube to form at least part of a laser amplifying medium; storage means located outside said tube for storing charge, said storage means applying a potential difference between said anode and cathode; and trigger means within said tube for acting as a switch to cause said storage means to discharge through said tube, power dissipated in the discharge being applied to said material, said trigger means including means for introducing an electron beam into said tube, wherein, on introduction of the electron beam into said tube, said discharge is established between said anode and cathode, wherein said tube defines a volume within which, during operation, laser action occurs, wherein said storage means comprises a capacitor having plates, wherein the anode and cathode are connected directly to respective plates of the capacitor, and including means for charging the capacitor.

20. A laser for use with a capacitor having first and second plates, comprising:
   means for defining a resonant cavity, said means including a gas filled tube having a longitudinal axis and having a tube wall;
   a metal first segment within the tube, the first segment having a hollow interior and being disposed so that the longitudinal axis extends through the interior of the first segment;
   means extending through the tube wall for electrically connecting the first segment to the first plate of the capacitor;
   a metal second segment within the tube, the second segment having a hollow interior and being disposed, at a position spaced apart from the first segment, so that the longitudinal axis extends through the interior of the second segment;
   means extending through the tube wall for electrically connecting the second segment to the second plate of the capacitor;
   trigger means inside the tube for acting as a switch to cause the capacitor to discharge through the tube; and
   means extending through the tube wall for conveying a potential to the trigger means.

21. The laser of claim 20, wherein the trigger means comprises a metal third segment within the tube, the third segment having a hollow interior and being disposed so that the longitudinal axis runs through the interior of the third segment, the third segment being positioned between the first and second segments and being spaced apart form the first and second segments.

22. The laser of claim 21, further comprising a metal fourth segment within the tube, the fourth segment having a hollow interior and being disposed so that the longitudinal axis extends through the interior of the fourth segment, the fourth segment being positioned between the second and third segments and being spaced apart form the second and third segments.

23. The laser of claim 22, further comprising at least one metal fifth segment within the tube between the second and fourth segments, each at least one fifth segment having a respective hollow interior and being disposed so that the longitudinal axis runs through the respective hollow interior.

24. The laser of claim 22, wherein the first, second, third, and fourth segments are hollow cylindrical members coaxially disposed about the longitudinal axis.

25. The laser of claim 24, wherein at least one of the cylindrical members comprises a plurality of cylindrical elements arranged coaxially about one another.

26. The laser of claim 20, wherein the trigger means comprises electron beam means for introducing an electron beam within the tube.

27. The laser of claim 26, wherein the electron beam means is disposed adjacent the first segment and comprises a cathode member and an anode member adjacent the cathode member.

28. The laser of claim 27, wherein the anode member is connected to the first segment and has an annular cavity, and wherein the cathode member is annular and is disposed in the annular cavity, the means extending through the tube wall for conveying a potential being connected to the cathode member.

29. The laser of claim 27 further comprising a metal third segment within the tube, the third segment having hollow interior and being disposed so that the longitudinal axis runs through the interior of the third segment, the third segment being positioned between the electron beam means and the second segment and being spaced apart from the electron beam means and the second segment.

30. The laser of claim 29, further comprising a metal fourth segment within the tube, the fourth segment having a hollow interior and being disposed so that the longitudinal axis runs through the interior of the fourth segment, the fourth segment being positioned between the second and third segments and being spaced apart from the second and third segments.

31. The laser of claim 30, wherein the first, second, third, and fourth segments are hollow cylindrical members coaxially disposed about the longitudinal axis.

32. The laser of claim 20, wherein the means for defining a resonant cavity further includes a window attached to the tube, the longitudinal axis running through the window.

* * * * *